United States Patent [19]

Kearns et al.

[11] Patent Number: 4,981,711
[45] Date of Patent: Jan. 1, 1991

[54] TEXTURIZED SINKING FOOD FOR MARINE LIFE

[75] Inventors: Joseph P. Kearns, Overland Park; Gordon R. Huber, Sabetha, both of Kans.

[73] Assignee: Wenger Manufacturing, Inc., Sabetha, Kans.

[21] Appl. No.: 360,375

[22] Filed: Jun. 2, 1989

[51] Int. Cl.$^5$ .......................... A23K 1/10; A23K 1/18; A23L 1/326

[52] U.S. Cl. ........................................ 426/1; 426/643; 426/805

[58] Field of Search .......................... 426/1, 643, 805

[56] References Cited

U.S. PATENT DOCUMENTS

| | | | |
|---|---|---|---|
| 3,359,115 | 12/1967 | Lanz | 426/643 X |
| 3,796,812 | 3/1974 | Baensch | 426/643 X |
| 4,732,766 | 3/1988 | Lindgard | 426/1 |
| 4,741,904 | 5/1988 | Smith et al. | 426/1 |
| 4,764,383 | 8/1988 | Brown et al. | 426/1 |
| 4,816,278 | 3/1989 | Sasamoto et al. | 426/643 X |
| 4,863,754 | 9/1989 | Ibuki et al. | 426/643 |

FOREIGN PATENT DOCUMENTS

| | | | |
|---|---|---|---|
| 251218 | 4/1963 | Australia | 426/1 |
| 2500724 | 9/1982 | France | 426/643 |

*Primary Examiner*—Arthur L. Corbin
*Attorney, Agent, or Firm*—Hovey, Wllliams, Timmons & Collins

[57] ABSTRACT

A texturized sinking shrimp and fish food is produced in the form of an extrusion cooked, cellular produce which is self-sustaining in ambient temperature water for a period of at least four hours and is made up of a mixture of at least 8 percent marine meal with up to 60% vegetable protein flour. The product is prepared by mixing and then partially cooking the starting materials in a preconditioner and then introducing the precooked mixture into an extruder (preferably of the twin screw variety) for texturization. During extrusion, the protein within the mixture is developed into laminar striations, which ultimately yields a layered, open-celled, high protein product having a specific gravity greater than 1.00 which will not readily decompose in water during consumption by the shrimp and fish.

4 Claims, 3 Drawing Sheets

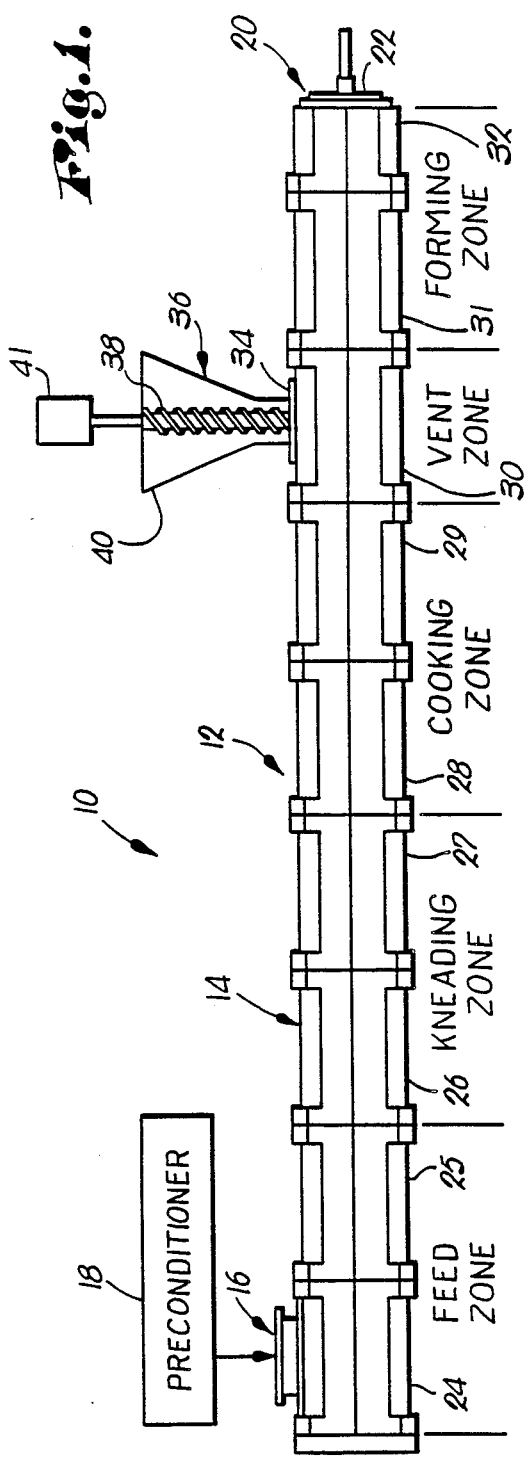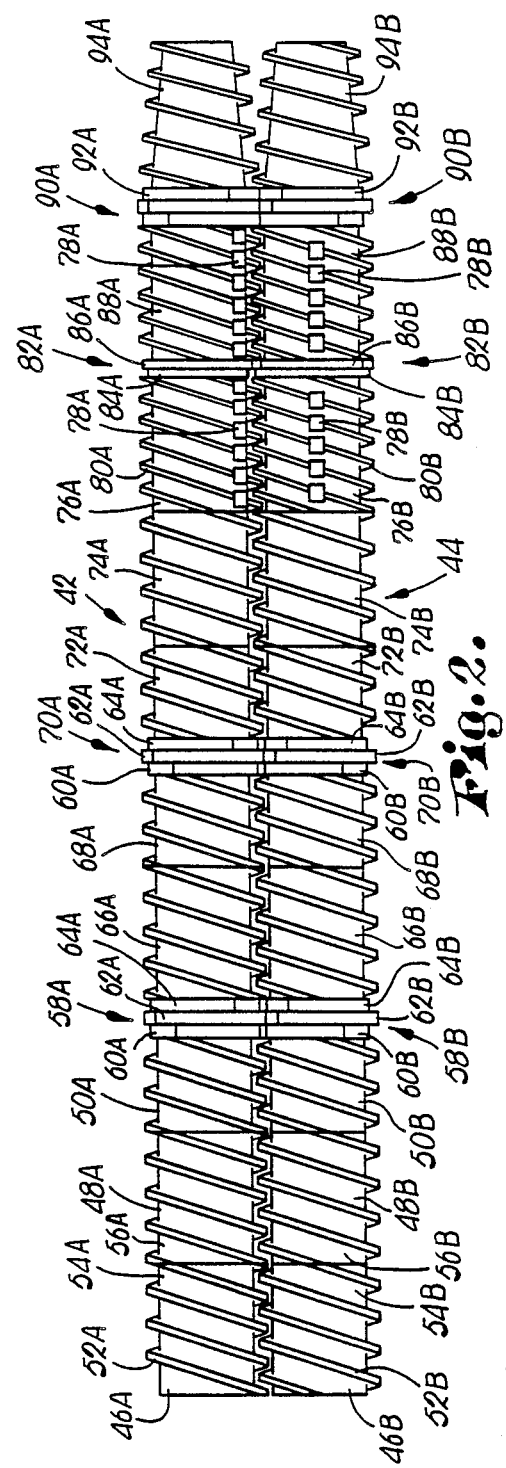

10 X

200 X

200 X

600 X

20X

200X

20X

200X

TEXTURIZED SINKING FOOD FOR MARINE LIFE

BACKGROUND OF THE INVENTION

1. Field of the Invention

The present invention relates to a high protein, extrusion processed, texturized sinking food for marine life (e.g., shrimp and fish) which contains a substantial quantity of marine meal. The starting material is first preconditioned and then extruded to yield a shrimp and fish food preferably having a specific gravity greater than 1.0 which is self-sustaining in water for a period of at least four hours. The particular specific gravity desired may be controlled by process conditions. The resulting product contains a high content of fish oil, an essential nutrient for fish, shrimp and other marine life. The food hereof is in the form of a texturized product having a plurality of gas cells therein, whereby feeding shrimp or fish may eat the outer portion without causing product breakup an unacceptably high dissipation of nutrients into the surrounding water.

2. Description of the Prior Art

An increasing demand for high quality protein sources has resulted in the flourishing aquaculture industry, whereby fish, shrimp and other marine life are raised commercially much in the manner of cattle, hog and other livestock. As the aquaculture industry has developed, a demand has arisen for a high quality, nutritional sinking food which will produce optimum yields from the marine life being cultured.

It has been determined that a sinking food is most desirable in raising cultured marine life, inasmuch as it most closely accommodates their natural feeding tendency to bottom feed. In the past, two principal methods have been employed in attempting to make a satisfactory sinking fish food. Uncooked, pelletized products have been produced using conventional pellet mills. Such products typically include high proportions of marine (fish) meal, a prime nutrient in these feeds. However, such pelletized feeds suffer from the fact that they do not satisfactorily retain their structural integrity in the water, resulting in rather rapid dissipation in water. High nutrient dissipation lessens the food value of the product and can pollute the water in which the fish or shrimp are raised. In addition, such pelletized products require the addition of a binder, providing little additional nutrition to the fish but requiring an added expense.

On the other hand, past extruded fish foods of farinaceous composition have been essentially amorphous products which tend to "puff up" in water and become mushy. As a result, these products also tend to dissipate nutrients into the surrounding water, particularly when a shrimp bites into the feed.

In order to be truly acceptable, a sinking marine food should be essentially self-sustaining in water for a period of at least about 4 hours. This would permit the aquaculturist to periodically introduce the feed into water at convenient times, without fear of undue nutrient dissipation or product breakup. At the same time however, such a marine food should contain proper nutrients such as relatively high contents of marine meal and oils.

SUMMARY OF THE INVENTION

It is therefore a principal object of the invention to provide a texturized sinking marine food having a high protein and oil content and which is self-sustaining in ambient temperature water for a period of at least about four hours. The product has a series of discrete interconnected layers as opposed to the amorphous composition of earlier extruded fish food products. The product preferably has a specific gravity in excess of 1.00 in order to sink in the water. However, if desired, the specific gravity may be controlled by process conditions to be less than 1.00 . By virtue of the fact that the product is self-sustaining in water for a period of at least four hours, it is not subject to the mushiness which causes the loss of nutrient value and thus remains both appealing to fish and nutritious when consumed.

The product hereof is texturized by extrusion yielding a uniform product having protein striations existing within the microstructure of the product. Yet further, the product has proteinaceous walls defining a plurality of open cells therein. To this end, the product is macrostructurally formed without use of a binder in order to yield a product with the maximum nutritional value. By providing this texturized cellular structure, the fish food is provided with sufficient stability in water and resists breakup when bitten by the fish or shrimp. When exposed to water, the product has a rubber-like texture which is further evidence of its texturization. It is of a high density and is of a high nutrient level not heretofore produced by an extrusion process.

A further object of the invention is to provide an extrusion cooking process for the production of layered, texturized fish food having the properties hereinabove described. A mixture of marine meal having a high protein content and adequate quantities of fish oil is mixed and partially cooked within a preconditioner or mixing cylinder. The mixture may also include vegetable protein flour in appropriate quantities. The mixture is then partially cooked before being introduced into an extruder, which is preferably a twin screw type extruder which cooks the mixture to yield an extruded product. During the extrusion process, the mixture is subjected to conditions of high mechanical shear, agitation and pressure. The extruder is provided with at least one helical screw therethrough which axially rotates to advance the material through the extruder. At the outlet of the extruder, the material is extruded through a venturi die to produce the extruded product, which may be further dried for storage and transportation.

BRIEF DESCRIPTION OF THE DRAWINGS

FIG. 1 is a fragmentary, side elevational view in somewhat schematic form illustrating an exemplary extruder used for cooking and extruding a mixture into a texturized sinking fish food in accordance with the principles of the present invention;

FIG. 2 is an enlarged plan view of the twin flighted screws positioned within a barrel of the extruder for use in accordance with the process of the present invention.

DETAILED DESCRIPTION OF THE DRAWINGS

Figure 3:
FIGS. 3–6 are electron scan photomicrographs of a typical texturized sinking marine food product in accordance with the present invention, having first been torn, taken at 10, 200, 200, and 600 magnifications respectively across the torn surface.

Turning initially to FIG. 1, an extrusion apparatus 10 is shown and includes an extruder 12 having a barrel 14 with an inlet 16 located below an outlet of a preconditioner 18; the extruder 12 also having an outlet 20 with a die 22. The barrel 14 as depicted comprises nine barrel sections 24, 25, 26, 27, 28, 29, 30, 31 and 32, although the number of barrel sections may vary without departing from the principles of the present invention. The barrel sections 24, 25, 26, 27, 28, 29, 30, 31 and 32 are interconnected to present an elongated bore through the barrel 14 of the extruder 12. Barrel section 30 is provided with a vent opening 34 and a venting assembly 36. Venting assembly 36 is operably coupled to the vent opening 34. The venting assembly 36 includes a rotatable vertical screw 38 within a housing 40 operably coupled to a motor drive unit 41 for rotating screw 38.

Referring now to FIG. 2, two rotatable, flighted material-advancing screws 42, 44 are received in the bore of the barrel 14 and are intermeshed along the majority of the length of the extruder barrel 14 except at the region of the final twin frustoconical barrel section 32. Final barrel section 32 presents a bore with respective, complemental frustoconical regions in order to split the material being proceesed into two juxtaposed, noncommunicating streams.

The twin screw extruder 10 as illustrated in FIGS. 1 and 2 is manufactured by Wenger Manufacturing, Inc., the assignee of the present invention. The preferred extruder is designated as the Wenger TX extruders, depicted in Wenger Bulletins No. WI-988BH and 56-587 which are hereby expressly incorporated into the disclosure herein. The Wenger TX extruder has been found to provide moderate pressure differentials in the twin head outlet sections, on the order of 500 psi to 600 psi; this factor is believed to be at least partially significant in obtaining the unique results of the present invention. The preconditioner 18 shown in FIG. 1 is manufactured by Wenger Manufacturing, Inc. and is compatible with the particular TX extruder as may be used herewith.

As shown in FIG. 2, each rotatable screw 42, 44 is composed of a series of screw sections which are supported on a central, splined shaft (not shown) for simultaneous rotation. The particular screw sections are the same for each screw but may be oriented differently to provide the desired intermeshing effect. Thus, the suffix A will be used to designate the sections on screw 42 while the suffix B will be used to designate the corresponding sections on screw 44.

Screw sections 46A and 46B, are located at the upstream or inlet end of the barrel 14. Each screw section 46A, 46B, 48A, 48B, 50A, and 50B are double flighted screw sections which have flighting 52. Flighting 52 defines a pair of helical grooves 54, 56 on each of the screws 42 and 44. The grooves 54A, 54B, 56A, 56B are substantially continuous along the lengths of the three screw sections 46A, 46B, 48A, 48B and 50A, 50B of each screw. Thereafter, in a downstream direction, a first shear lock group 58A and 58B is located on each screw 42 and 44. Each shear lock group 58A and 58B includes three lobed shear locks 60, 62, and 64 sequentially aligned on the respective screw 42 and 44. The individual shear locks 60, 62 and 64 are double lobed shear locks and are displaced at 45° angles to the adjacent shear lock to present each of the lobes on each shear lock 60, 62 and 64 out of alignment with the other shear locks in the shear lock group 58.

Shear lock group 58 is succeeded downstream within the barrel 14 by screw sections 66 and 68 on each screw 42, 44. Screw sections 66 and 68 are also double flighted and the grooves thereof are substantially continuous along the two screw sections 66 and 68 of each screw 42, 44.

Immediately downstream from screw section 68 is a second shear lock group 70 which also consists of three double lobed shear locks identical to the shear locks previously described in shear lock group 58.

Double flighted screw section 72 is located immediately downstream from shear lock group 70 as is screw section 74 succeeding thereafter. However, the grooves defined between the flighting of screw section 72 is not continuous into screw section 74, as screw section 74 is rotated some 60 degrees out of sequence with screw section 72 so that the flighting and thus the grooves are not continuous therebetween.

Screw sections 74A and 74B are followed downstream on their respective screws by a cut flight screw section 76. Cut flight screw section 76A and 76B corresponding to each screw 42 and 44 are also double flighted but the distance between the flighting is reduced to provide increased shearing of the mixture advanced therealong. Cut flight screw sections 76A and 76B are characterized by equally spaced gaps 78 in the flighting 80 of each cut flight screw sections 76A and 76B. The gaps 78 are essentially areas where the flighting has been eliminated to provide a region which is of equivalent radius to that of the groove ordinarily defined between the flighting 80. The cut flight screw sections 76A and 76B are employed to incorporate increased mixing, kneading and shear into the mixture as well as increasing the retention time of the mixture in the extruder.

Cut flight screw sections 76A and 76B are followed downstream by respective cylindrical shear lock groups 82A and 82B. Cylindrical shear lock group 82 includes a pair of cylindrical sections whereby cylindrical shear lock 84A on screw 42 is of a greater diameter and complements the reduced diameter of cylindrical shear lock 84B on screw 44, while cylindrical shear lock 86A on screw 42 is of a reduced diameter and complements cylindrical shear lock 86B on screw 44 which is of greater diameter. As shown in FIG. 2, cylindrical shear lock 84A and cylindrical shear lock 86B are of the same diameter while cylindrical shear lock 84B and cylindrical shear lock 86A are of the same, reduced diameter.

Thereafter, a second set of cut flight screw sections 88A and 88B having gaps 78A and 78B are positioned downstream from cylindrical shear lock group 82A and 82B on respective screws 42 and 44. Second cut flight screw sections 88A and 88B are substantially the same as first cut flight screw sections 76A and 76B, respectively.

Thereafter, third lobed shear lock group 90 is located on each of the screws 42 and 44. Third lobed shear lock group 90 is composed of three to six individual two-lobed shear locks 92 of identical configuration, each next adjacent downstream two-lobed shear lock 92 being oriented 40 degrees from the next preceding two-lobed shear lock. Final conical screw sections 94A and 94B are also double flighted screws defining grooves therebetween, but are of frustoconical configuration such that the pitch diameters of the screw sections 94A and 94B decrease in a downstream direction.

The particular configuration of the screws 42 and 44 allows the material introduced into inlet 16 to be advanced along the screws, while shear lock groups 58, 70, 84, and 90 serve to assist in working and kneading the mixture while bringing the pressure within the barrel 14 to a level above atmospheric.

In accordance with the present invention, a process for making a texturized, sinking shrimp and fish food is provided, and includes the step of introducing a mixture which includes at least 8% and up to 97% marine meal, and preferably 20 to 90% marine meal containing from 5% to 65% marine protein, through the inlet 16 into the barrel of the extruder 12. The marine meal and water mixture is initially prepared in the preconditioner 18 by mixing fish meal and water and elevating the temperature of the mixture to a level of from about 90° F. to 210° F. for a residence time of 30 seconds to three minutes, although a residence time of one to two minutes at a temperature of 160° F. to 210° F. is preferred. Such elevation accomplishes some precooking of the mixture, although alternatively, the mixture may be premoistened prior to extrusion and the preconditioning step omitted. However, a premium product and higher and more economical production are achieved by preconditioning the mixture. The mixture may also include added nutrients such as vegetable protein flour (soy flour or cottonseed flour), wheat gluten as a binding agent, shrimp meal, wheat flour, fish oil, calcium chloride, sodium phosphate and sulphur. Desirably, the moisture content of the mixture upon leaving the preconditioner and entering the extruder is about 10 to 30% by weight of water, with better results being observed when the mixture is about 18 to 20% by weight of water.

Once the fish meal and water mixture is introduced into the extruder barrel 14 through inlet 16, the mixture is advanced along the length of the barrel 14 by axial rotation of screws 42 and 44. The mixture is sequentially advanced through the extruder and finally through holes of venturi die 22 at the outlet 20 of the extruder 12 to yield an extruded product. As the mixture passes through the barrel sections 24, 25, 26, 27, 28, 29, 30, 31 and 32, it is cooked and subjected to increased temperature.

Typically, barrel sections 24 and 25 will comprise a feed zone where the mixture is introduced, and compressed into the extruder barrel 14, followed by a kneading zone where the mixture is texturized and heated. The kneading zone is followed by a cooking zone for thoroughly cooking, denaturing and texturizing the protein of the mixture. This is followed by an optional venting zone, corresponding to barrel section 30, whereby moisture and gases may be removed from the mixture to produce a denser product having a greater specific gravity. Thereafter, the product optionally proceeds through a forming zone in barrel sections 31 and 32 where the temperature may be reduced and the product densified and formed prior to extrusion through the die.

The temperature of the mixture within the barrel 14 is preferably in the range of about 150° F. to a maximum of about 350° F., although normally the maximum temperature will be from about 230° F. to about 300° F. The pressure within the extruder may be as high as 1,500 pounds per square inch, but the maximum pressure is preferably in the range of about 400 to 600 pounds per square inch and better results have been observed when the maximum pressure is about 500 pounds per square inch. Also, the residence time of the mixture within the extruder 12 is within the range of about 10 seconds to 60 seconds, and preferably is about 30 seconds.

Both water and steam may be injected into the mixture as the same is advanced along the barrel 14. For example, tap water may be injected into one of the barrel sections such as section 24, with the temperature in the range of 50° F. to 190° F., and steam may be added to both the preconditioner 18 and the extruder barrel 14. For example, steam in an amount equivalent to approximately 8% by weight (wet basis) of the raw mixture may be added to the mixing cylinder while steam in the amount of 3% by weight (wet basis) of the raw mixture may be added to the extruder to yield a desirable, denatured proteinaceous product.

Finally, the mixture may leave the extruder with an overall moisture content of 8 to 25% water by weight, although better results have been found when the extruded product is about 18 to 19% water by weight.

Barrel 14 of extruder 12 advantageously is jacketed so that coolant water or oil can circulate in the extruder 12 adjacent the bore receiving the screws 42 and 44 therein for subjecting the fish meal and water mixture to indirect thermal interchange during advancement thereof along the length of the barrel 14. Other expedients such as electrical resistance or induction heating could also be employed. Preferably, the mixture during travel through the entire length of extruder 12 has a temperature in the range of from approximately 150° F. to approximately 300° F. subject, of course, to the maximum temperatues as set forth hereinabove.

As the mixture is passed from the extruder 12 and through the die 22 to yield an extruded product, a knife, held under compression against the outside face of die 22 severs the extruded product to the desired length. Next, the products are advanced to a drying station in order to render the same suitable for storage and transport. The extruded product may be dried at a temperature of about 250° F. for a period of 10 minutes to yield a product which is suitable for storage and transport. During the extrusion process, the mixture is texturized by moving the mixture under moderate pressure through moderately high levels of shear, compression and mechanical agitation, both in an axial direction relative to the direction advanced through the extruder and also transversely thereof. During extrusion, the product is texturized by this combination of forces and yields a product which has lines of weakness to create a layered product. Upon exiting the extruder, the steam within the product flashes to produce a number of gas cells which reveal striations which indicate stretching of oriented protein. The layers are interconnected mechanically and not by a binder, and upon drying, the product is uniform and "layered". The use of a venturi die 22 assists in providing the cellular structure of the product.

FIGS. 3-10 illustrate the type of product which emerges from the extruder in the preferred process of the present invention. The product shown in FIGS. 3-6 was first soaked in water at 25° C., torn apart, freeze-dried and viewed across the torn surface. FIG. 3, taken at low magnification, reveals the layering of the product by the overall orientation of the cellular structure in a transverse direction as shown therein. The lines of weakness within the product are also shown which especially enable shrimp or fish to bite off portions while the remainder of the product remains intact. FIG. 3 also reveals the spongy appearance indicative of a texturized product after soaking in water, which has a rubbery texture.

Figure 4:
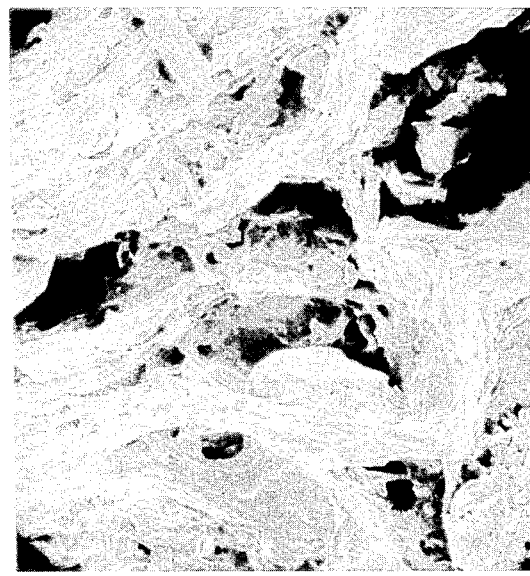
Figure 5:
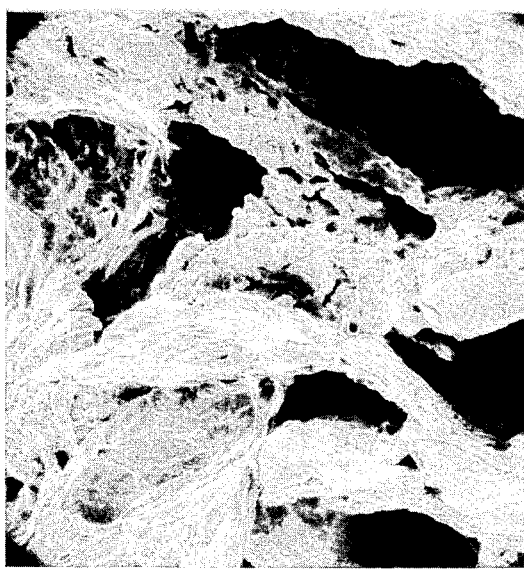
Figure 6:
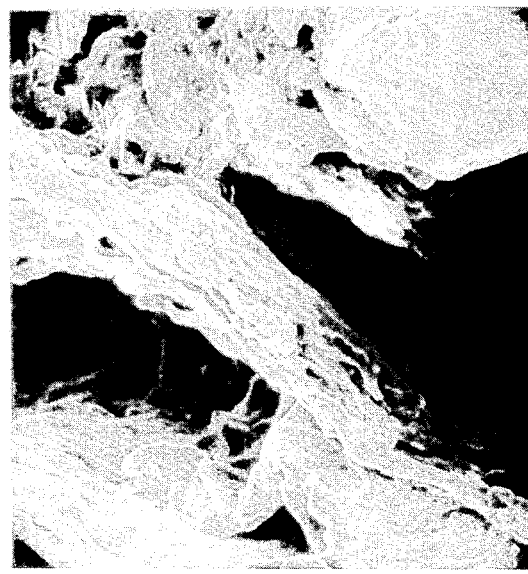

FIGS. 4-6 are photomicrographs taken at greater magnification than FIG. 3. FIGS. 4-6 show the open cells and cell walls within the product, produced when the superheated steam within the product flashes upon exiting from the venturi die. The think fibrils of textured soy protein are not seen, but the cell walls show striations which indicate stretching of oriented protein.

Figure 7:
FIGS. 7–8 are electron scan photomicrographs of a typical texturized sinking marine food product in accordance with the present invention, taken at 20 and 200 magnifications across a cut section thereof.
Figure 8:

FIGS. 7 and 8 are photomicrographs of the product first cut in a transverse direction, freeze-dried, and viewed at the cut surface. The transverse section of FIG. 7 shows the numerous cells within the product, while FIG. 8 illustrates in greater detail the protein striations along the cell wall.

Figure 9:
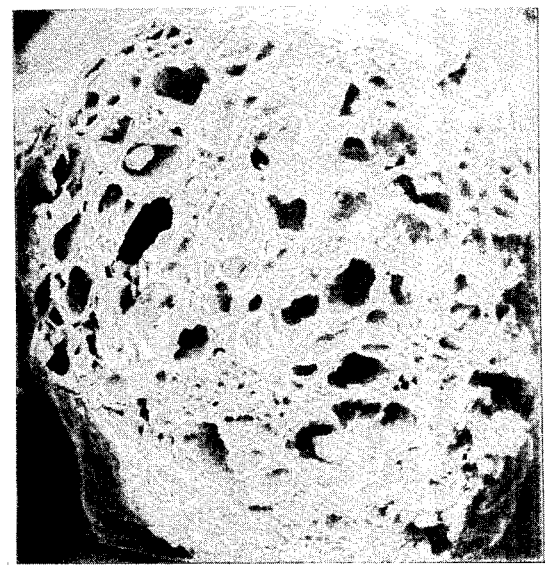
FIGS. 9 and 10 are electron scan photomicrographs of a typical texturized sinking marine food product in accordance with the present invention, taken at 20 and 200 magnification after soaking in water across a cut section thereof.
Figure 10:
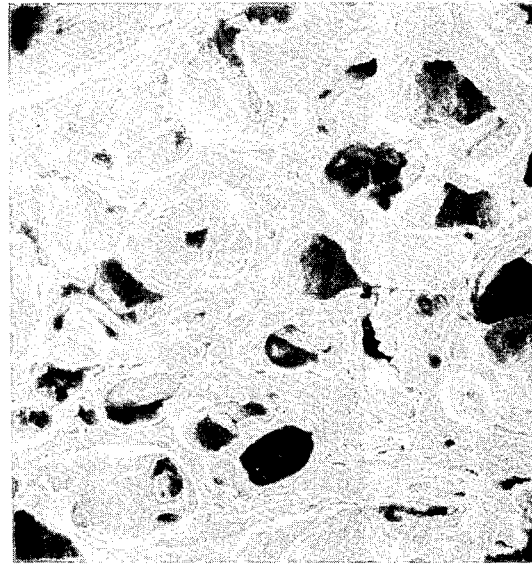

FIGS. 9 and 10 are photomicrographs similar to FIGS. 7 and 8 and taken at similar magnifications, but the product was soaked in water prior to cutting transversely while wet and then freezedried. Compairng FIGS. 7 and 9, and FIGS. 8 and 10, it may be seen that the gas cells created by extrusion expanded slightly during soaking in water, but without releasing a significant amount of solubles as indicated by the protein dispersibility index (PDI) of the product. The size and number of such cells may be increased by increasing the moisture of the process hereof or omitting the venting or forming zones.

The resulting sinking fish and shrimp food product has a specific gravity in excess of 1.00 and is self-sustaining in water for a period of a least four hours. By self-sustaining, it is meant that the product remains intact and will not disassociate, dissolve, or significantly expand when exposed to water. Some marine species, however, top feed, and a floating food may be produced by, e.g., adding moisture or omitting the venting and forming zones. By virtue of its texturized properties, the product hereof has a protein dispersibility index (PDI) of between 8 and 15%, which is the ratio of water soluable protein to total protein. The protein dispersibility index is a test established by the American Association of Cereal Chemistry as AACC Method 46-24 revised 10-30-75, a two page reference which is incorporated by reference. The product has a digestible oil content of 1% to 15% by weight having an overall crude protein content from about 43% to about 61%. Of course, additional oil may be added to the extruded product to boost the overall oil content to the level desired. In accordance with the process hereof, the product may contain as high as 97% fish meal which, when combined with suitable amounts of water, yields a high protein, high oil product.

The texturized product is obtained by rotation of the screws within the extruder and the work thereby done on the mixture introduced into inlet 16. The rotation of the screws 42 and 44 serve to simultaneously work and stretch the mixture and subjects the mixture to axially and transversely directed displacement forces in the barrel section, as well as continuously moving the mixture into and through the die 22 on the barrel. By moving the mixture under conditions of superatmospheric pressure and high heat, as well as compression, agitation and shear, the product is extruded in a hot, flowable stratified condition with the protein in the layers flowing in striations. The protein is denatured during the cooking and pressurization process, and, being in a texturized condition, yields the desirable low protein dispersibility index (PDI) range noted above.

EXAMPLE 1

In this test, a starting mix was prepared which contained 37% soy flour, 33.1% fish meal, 14.2% wheat gluten, 4.76% shrimp meal, 3.8% wheat flour, 3.2% fish oil, 1.9% calcium chloride, 0.95% sodium phosphate, and 0.19% sulphur was prepared. This dry mixture was then fed to a Wenger TX-52 twin screw extruder equipped with the preconditioner and processed to obtain a texturized sinking fish food. The TX-52 machine is of the type schematically illustrated in FIG. 1 and was provided with a screw configuration as shown in FIG. 2, but had a total of six tubular heads or barrel sections and terminates in a double screwed cone nose die head, having a venturi die mounted thereon.

The dry starting mixture was fed into a preconditioner at a rate of 5.33 pounds per minute where water was introduced into the preconditioner at a rate of 0.47 pounds per minute. The water and fish meal mixture in the preconditioner was raised in temperature by the injection of steam introduced at a rate of 0.25 kilograms per minute. Beaters in the preconditioner which may be pitched at different angles to provide a variety of possible residence times were rotated at a speed of 150 r.p.m.

Next, the mixture is fed into the inlet of the extruder and tap water was introduced to the mixture at a rate of 0.088 pounds per minute. The screws of the extruder were rotated at a speed of 440 r.p.m. and steam was introduced to the mixture at the rate of 0.12 kilograms per minute. The load on the extruder was 13.0 kilowatts. The load on the extruder without the mixture present at 440 r.p.m. is about 1.2 kilowatts so that the increased load required by processing of the mixture therein is about 11.8 kilowatts.

Temperatures of the twin barrels were maintained at 184°, 280°, 273° and 252° for the third, fourth, fifth and sixth barrel sections respectively. The pressure recorded in the fifth head was 500 pounds per square inch. Product rate through the extruder, including the total amount of water added, was 390 pounds per hour. The extruder and product stability were both good, and the run yielded a product of good texture and shape. The product was cut with a two blade circular knife, and the moisture content of the extruded product immediately downstream from the die was 18.05% water by weight. Products were then fed to a drier and subjected to a temperature of 230° F. for a period of ten minutes. An assay of the product revealed it contained 61.36% crude protein and it had a protein dispersency index of 8.80%.

EXAMPLE 2

In this example, a soft, moist sinking marine food product was prepared from a mixture of 36% menhaden fish meal, 25% wheat flour, 20% soy flour, 6% propylene glycol, 5% blood meal, 4.2% fish oil, 2% brewers yeast, 1.5% of 75% phosphoric acid, and 0.3% potassium sorbate. This dry mixture was then fed to a Wenger TX-52 twin screw extruder equipped with a preconditioner and processed to obtain a texturized sinking fish food.

The dry starting fish meal mixture was fed into a preconditioner to which water was supplied at the rate of 0.598 pounds per minute. The water and fish meal mix were intimately mixed in the preconditioner and steam was introduced to the preconditioner at the rate of 0.20 pounds per minute. Upon leaving the preconditioner, the mixture had a moisture content of 16.47%. The premixed mixture was partially cooked in the preconditioner and fed into the extruder.

The extruder, a Wenger TX-52, was operated with a screw speed of 389 r.p.m. Steam was supplied to the extruder at the rate of 0.5 pounds per minute. Upon exiting the extruder, the product was found to have a total moisture content of 18.12%. After drying, the final moisture content was 5.68%. Temperature within the extruder was 298° at the sixth head and 212° at the seventh head. Analysis of the product revealed a crude protein content of 56.05% and a protein dispersency index of 8.26%.

EXAMPLE 3

In this test, a starting mixture of 40% soy flour, 35% menhaden fish meal, 15% wheat gluten, 4.50% shrimp meal, 4.0% wheat flour, 3.2% fish oil, and 1.0% sodium phosphate were combined to provide a dry mixture. This dry mixture was then fed into a Wenger TX-52 twin screw extruder equipped with a preconditioner and processed to obtain a texturized, sinking fish food product.

The dry starting fish meal mixture was fed into a preconditioner to which water was added at the rate of 0.247 pounds per minute. The water and shrimp meal mixture in the preconditioner was raised in temperature by the injection of steam introduced at the rate of 0.30 pounds per minute. The mixture when discharged in the preconditioner had a moisture content of 16.47%.

Next, the mixture was fed into the inlet of the extruder and water was added to the extruder at the rate of 0.353 pounds per minute. Steam was introduced into the extruder at the rate of 0.20 pounds per minute and the temperature of the mixture was recorded as 181° F. at the sixth head and 148° F. at the seventh head. The extruder was operated with the screws rotating at 336 r.p.m. and at a load of 5.6 kilowatts. The load on the extruder without the mixer present at 336 r.p.m. is about 1.2 kilowatts so the increased load required by the processing of the mixture therein is about 4.4 kilowatts.

After drying, the mixture was found to have a moisture content of 12% water by weight. An assay was run on the product thereby produced, which was determined to have an overall protein content of 40.047%, with fat present in the amount of 8.152%, fiber in the amount of 1.412% and ash in the amount of 9.397%. Marine oil was found to make up 7.656% of the mixture, while 21.996% was marine protein and 20.675% was starch.

We claim:

1. A texturized sinking food for marine life, comprising at least about 8% by weight marine meal, said food having a specific gravity greater than 1.00 so that the food sinks in water, a protein dispersibility index of less than 15%, and a plurality of interconnected heat-denatured proteinaceous layers defining a plurality of open cells therewithin said food being self sustaining in water for a period of at least 4 hours, said cell-defining layers consisting essentially of heat-denatured protinaceous material.

2. A texturized sinking food as set forth in claim 1, said food having a digestible oil content of from 1% to 25% by weight.

3. A texturized sinking food as set forth in claim 1 having a marine protein content of between 5% and 65% by weight.

4. A texturized sinking food as set forth in claim 1 having a moisture content by weight of 5% to 30%.

* * * * *